United States Patent
Schreiber et al.

(10) Patent No.: US 9,428,147 B2
(45) Date of Patent: Aug. 30, 2016

(54) LINEAR DRIVE

(75) Inventors: Simon Schreiber, Schwaebisch Gmuend (DE); Hermann Grau, Durlangen (DE); Krzysztof Krukowski, Alfdorf (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/004,917

(22) PCT Filed: Mar. 14, 2012

(86) PCT No.: PCT/EP2012/001136
§ 371 (c)(1),
(2), (4) Date: Dec. 12, 2013

(87) PCT Pub. No.: WO2012/123115
PCT Pub. Date: Sep. 20, 2012

(65) Prior Publication Data
US 2014/0175781 A1    Jun. 26, 2014

(30) Foreign Application Priority Data
Mar. 15, 2011   (DE) .................. 10 2011 014 127

(51) Int. Cl.
*B60R 22/46* (2006.01)
*F15B 15/19* (2006.01)

(52) U.S. Cl.
CPC ........... *B60R 22/4633* (2013.01); *F15B 15/19* (2013.01); *B60R 2022/4661* (2013.01)

(58) Field of Classification Search
CPC .............. B60R 22/4633; B60R 2022/4661; F15B 15/19
USPC ............ 280/801.1, 806, 807, 808; 242/374; 297/468, 478, 480
See application file for complete search history.

(56) References Cited

U.S. PATENT DOCUMENTS

| | | | | |
|---|---|---|---|---|
| 3,871,470 | A * | 3/1975 | Schwanz et al. | 297/480 |
| 5,163,708 | A * | 11/1992 | Kotama | 280/806 |
| 5,284,307 | A * | 2/1994 | Kotama | 242/374 |
| 5,350,194 | A * | 9/1994 | Fohl | 280/805 |
| 5,366,245 | A * | 11/1994 | Lane, Jr. | 280/806 |
| 5,553,890 | A * | 9/1996 | Buhr et al. | 280/806 |
| 5,842,344 | A * | 12/1998 | Schmid | 60/632 |
| 6,089,605 | A * | 7/2000 | Muller | 280/806 |
| 6,374,609 | B1 * | 4/2002 | Evans et al. | 60/532 |
| 6,454,306 | B1 * | 9/2002 | Cunningham et al. | 280/806 |
| 6,641,074 | B2 * | 11/2003 | Shih et al. | 242/374 |
| 6,979,024 | B2 * | 12/2005 | Cunningham et al. | 280/806 |
| 7,063,353 | B2 * | 6/2006 | Wang | 280/735 |
| 7,690,292 | B2 * | 4/2010 | Woecht | 92/19 |
| 2008/0012283 | A1 * | 1/2008 | Woecht | 280/806 |

(Continued)

FOREIGN PATENT DOCUMENTS

| | | |
|---|---|---|
| DE | 10 2010 026 113 | 1/2012 |
| GB | 2 303 292 | 2/1997 |
| WO | 2012/003910 | 1/2012 |

*Primary Examiner* — Darlene P Condra
(74) *Attorney, Agent, or Firm* — Tarolli, Sundheim, Covell & Tummino LLP

(57) ABSTRACT

A linear drive, especially for a belt tensioner, includes a housing (10) including a piston seat (12), a piston element (16) accommodated in the piston seat (12) and a pyrotechnical drive element adapted to supply gas for displacing the piston element (16). The inner wall of the piston seat (12) includes a groove (30) extending in the displacing direction (R) of the piston element (16) through which gas can flow off the piston seat (12).

10 Claims, 2 Drawing Sheets

(56) References Cited

U.S. PATENT DOCUMENTS

2008/0290203 A1* 11/2008 Kohlndorfer et al. ........ 242/374
2008/0290204 A1* 11/2008 Verhoven et al. ............ 242/374
2012/0119478 A1* 5/2012 Lane, Jr. ...................... 280/806

* cited by examiner

FIG. 1  State of the Art

LINEAR DRIVE

RELATED APPLICATIONS

This application corresponds to PCT/EP2012/001136, filed Mar. 14, 2012, which claims the benefit of German Application No. 10 2011 014 127.8, filed Mar. 15, 2011, the subject matter, of which are incorporated herein by reference in their entirety.

BACKGROUND OF THE INVENTION

The invention relates to a linear drive, especially for a belt tensioner.

Linear drives in which a driven piston covers a predetermined travel distance are used as mechanical drive elements. The linear movement can be directly used for a push or pull movement, for example to withdraw a belt buckle. However, it can also be converted into a rotating movement, for example by means of a gear rack, so as to rotate, for instance, the belt reel of a belt retractor.

The kinetic energy is generated by combusting a pyrotechnical propellant and by the expansion of the hot gas being produced. The release of the gas has to be adapted to the parameters defining the movement of the moved piston, such as the housing size and the mass, so as to obtain an optimum acceleration of the piston and an optimum force transmission. It has turned out that it is favorable to have part of the gas flow off the combustion chamber after the beginning of movement of the component part.

It is known in this context, for instance, to provide one or more radial openings connecting the piston seat to the environment in the housing of the linear drive in the wall of a piston seat close to the pyrotechnical propellant moving the piston. Said openings are released shortly after the start of shifting the piston so that part of the gas can flow off the piston seat. In this way, on the one hand a motion-dependent pressure control and a well-directed pressure decrease after completed movement of the piston can take place.

Such linear drive is shown in FIG. 1. In a housing 10 a piston seat 12 and a cavity 14 directly connected thereto are formed. A piston element 16 is arranged in the piston seat 12, viz. before the beginning of the displacing movement in the displacing direction R directly at the left end of the piston seat 12 in FIG. 1 in direct vicinity to a pyrotechnical igniter 18. The piston element 16 includes a seat 20 in which a pyrotechnical propellant (not shown) is comprised that supplies the major part of the drive gas when ignited by the igniter 18.

The piston element 16 is rigidly connected to a gear rack 22 extending in parallel to the piston element 16 and being connected to the same at the end of the piston element 16 facing away from the igniter 18. When the piston element 16 moves in the displacing direction R, the teeth of the gear rack 22 mesh with the teeth of a gearwheel 24 connected to a belt reel not shown in detail and start to rotate the same.

In the wall of the housing 10 two small radial bores 26 are formed which lead from the piston seat 12 to the housing portion in which the gear rack 22 is accommodated and from there into the environment of the housing 10.

Before the displacing movement of the piston element 16 starts, the seat 20 is sealed inside the piston element 16 and the piston seat 12 is sealed against the bores 26 by a sealing member 28, in this case an O-ring, disposed at the igniter-side end of the piston element 16. Only when the sealing member 28 has passed the bores 26 upon movement of the piston element 16, gas flows off the piston seat 12.

Producing the radial bores 26 requires a relatively complicated operating step, which extends the production time and thus renders the linear drive more expensive.

SUMMARY OF THE INVENTION

It is the object of the invention to render the manufacture of a linear drive more cost-effective.

In the case of a linear drive comprising a housing, a piston seat, a piston element movably accommodated in the piston seat and a pyrotechnical drive element adapted to supply gas for displacing the piston element, this is achieved according to the invention by the fact that the inner wall of the piston seat includes a groove extending in the displacing direction of the piston element through which groove the gas can flow off the piston seat. It is easier to produce the groove in the inner wall of the piston seat than to produce bores in the housing wall. Moreover, by the width and the depth of the groove the gas volume flowing off can be adjusted in a very exact and simple manner. Due to the long way along the relatively massive housing wall the outflowing gas is cooled. The gas is discharged into an enclosed housing area which is necessary to accommodate the piston element during the displacing movement thereof. This has the advantage that a flow against vehicle parts is prevented without further component parts having to be provided for this purpose.

The invention can be excellently used in a linear drive in which the piston element is connected to a gear rack. As a matter of course, the principle according to the invention can also be realized in other linear drives.

The groove is preferably designed so as to permit a gas discharge into the housing ahead of the piston element viewed in the displacing direction. Since the groove is arranged radially in the wall of the piston seat, the gas discharge is not inhibited even when the piston enters into this housing area. By flowing into a large-volume housing area the gas flowing out of the piston seat can further expand and thus cool, before it reaches the environment of the linear drive. The escaping gas therefore has no more disturbing effects on vehicle parts in the environment of the linear drive.

Radial openings in the wall of the piston seat are neither necessary nor provided. The groove is completely received in the wall of the piston seat without outwardly breaking the same through.

Preferably the groove extends over more than the length of the displacing distance corresponding approximately to the length of the piston element. This ensures a safe discharge of the gas from the piston seat.

It is possible to design the groove so that the same widens in the displacing direction so as to promote expansion of the gas. The amount of gas flowing off can also be adapted via the configuration of the groove, for example by widening the same in such way, in a well-directed and individual fashion for a particular linear drive.

The groove and the piston element are preferably arranged in the piston seat so that before the beginning of displacement of the piston no gas gets into the groove. Accordingly, initially all the gas generated is used to bring about an increase in pressure in the piston seat and to start moving the piston element. In this way, high acceleration and rapid displacement of the piston element can be effectuated. By releasing the groove and the start of discharge of the gas from the piston seat shortly after the beginning of movement of the piston element excessive pressure build-up and excessive acceleration of the piston element are avoided, however.

The length of the groove is preferably between 35 and 70 mm. Thus a safe and reliable pressure relief is possible over almost the entire piston travel.

By appropriately positioning and dimensioning the groove, on the one hand, the pressure relief and the pressure curve, resp., can be adjusted, and also the tensioning performance can be adjusted in this way. For a particularly effective tensioning performance while simultaneously optimizing the pressure decrease, the groove initially has a cross-section ranging approximately from 1.5 mm² to 9 mm². In the case of a groove widening in the displacing direction, the cross-sections advantageously are increased to values between about 3 mm² and 15 mm².

The cross-section of the groove increasing over the displacing distance moreover offers the further advantage that the gas flowing past is effectively cooled by the enlarging surface and the simultaneous expansion.

The groove has a preferably rounded cross-section, wherein especially the transitional area between the inner wall of the piston seat and the groove is rounded. In addition, it is of advantage when also the two transitional areas are interconnected by an oppositely rounded portion.

The piston element can include at least one sealing member located between the piston element and the inner wall of the piston seat which is configured so that it does not prevent gas from being discharged into the groove. As soon as the sealing member has reached the groove in the axial or displacing direction, gas continues flowing off the piston seat as the sealing member does not completely fill the groove.

A groove widening in the displacing direction moreover has the advantage that damage of the sealing upon inserting the piston is avoided, because the transitional area of the groove always contacts different positions of the sealing over the inserting distance. It is of particular advantage in this case when sharp-edged transitional areas are avoided between the groove and the inner wall of the piston seat and when the transitional areas have a rounded design. Hereinafter the invention is described in detail by way of an embodiment and in connection with the enclosed Figures. The drawings show in:

DESCRIPTION OF EXEMPLARY EMBODIMENT

Figure 1:
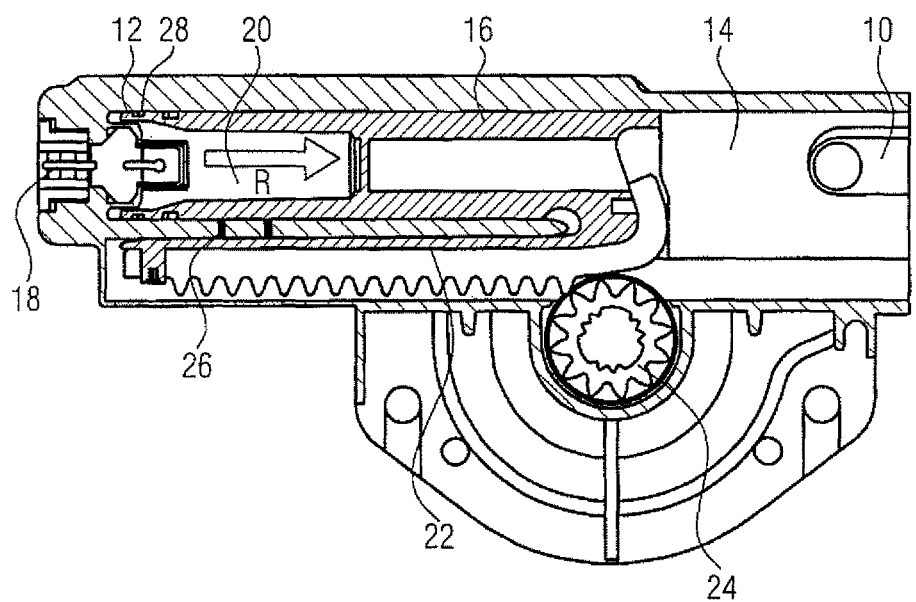
FIG. 1 a schematic sectional view of a linear drive according to the state of the art.

FIG. 1 which has been described in detail already in the introductory part illustrates a known linear drive.

Figure 2:
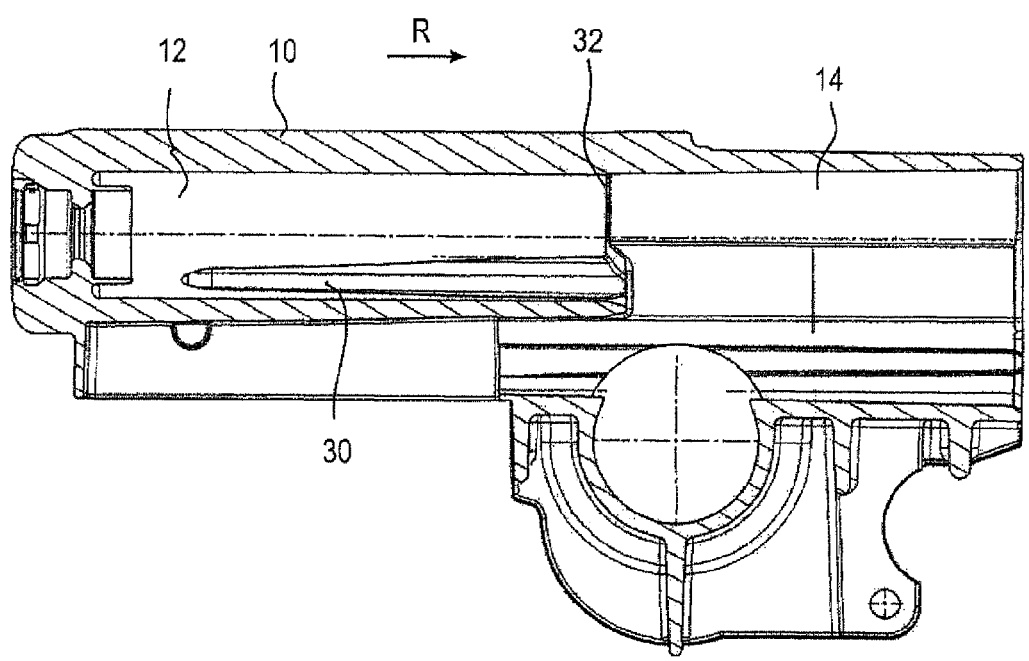
FIG. 2 a schematic sectional view of a linear drive according to the invention without the movable mechanical components.

The linear drive according to the invention shown in FIG. 2 substantially differs from the linear drive illustrated in FIG. 1 in the way in which a discharge of the gas from the piston seat is provided. The component parts not shown in FIG. 2 can be configured as shown in the known linear drive. For this reason, also the previously introduced reference numerals for the component parts of the linear drive according to the invention are further used in FIG. 2.

The housing 10 of the linear drive comprises a piston seat 12 and a cavity 14 axially directly connected thereto into which the piston element 16 not shown here moves when being displaced in the displacing direction R. The cavity 14 is in fluid communication with the environment of the linear drive.

A gear rack 22 equally not shown drives a gearwheel 24 equally not shown which is connected to the belt reel of a belt retractor (not shown in detail).

In the inner wall of the piston seat 12 a groove 30 extending in the displacing direction R and reaching to the axial end 32 of the piston seat 12 is spared. On the igniter side the groove 30 starts a short distance from the igniter 18 (only the seat of which is shown).

Prior to activating the linear drive and prior to moving the piston element 16, the piston seat 12 is sealed in a gas-tight manner against the groove 30 by the sealing member 28 at the piston element 16. Only when the piston element 16 has moved in the displacing direction R so far that the sealing member 28 has reached the beginning of the groove 30, gas starts flowing off the piston seat 12 into the cavity 14. The groove 30 is configured to be approximately as long as the entire displacing distance of the piston element 16.

The sealing member 28 is configured so that upon reaching the groove 30 it does not fill and thus seal the same but allows gas discharge from the piston seat 12 during the entire further displacing distance.

The invention claimed is:

1. A linear drive-for a belt tensioner, comprising a housing (10) including a piston seat (12) free of a radial opening, a piston element (16) connected to a gear rack (22) being movably accommodated in the piston seat (12) and a pyrotechnical drive element adapted to supply gas for displacing the piston element (16),
wherein the inner wall of the piston seat (12) includes a groove (30) extending in the displacing direction (R) of the piston element (16) through which gas can flow off the piston seat (12),
and the groove (30) being configured so as to allow a gas flow into the housing (10) ahead of the piston element (16) viewed in the displacing direction (R),
and wherein the length of the groove ranges from 35 mm to 70 mm.

2. The linear drive according to claim 1, wherein the groove (30) and the piston element (16) are arranged in the piston seat (12) so that before the beginning of displacement of the piston element (16) no gas enters into the groove (30).

3. The linear drive according to claim 1, wherein at the piston element (16) at least one sealing member (28) is arranged which is located between the piston element (16) and the inner wall of the piston seat (12) but is configured so that it does not prevent gas from flowing into the groove (30).

4. The linear drive according to claim 1, wherein the cross-sectional area of the groove is larger than 1.5 mm².

5. The linear drive according to claim 1, wherein the cross-sectional area of the groove is smaller than 15 mm².

6. The linear drive according to claim 1, wherein the housing ahead of the piston element is in fluid communication with the environment at all times.

7. A linear drive-for a belt tensioner, comprising a housing (10) including a piston seat (12), a piston element (16) connected to a gear rack (22) being movably accommodated in the piston seat (12) and a pyrotechnical drive element adapted to supply gas for displacing the piston element (16),
wherein the inner wall of the piston seat (12) includes a groove (30) extending in the displacing direction (R) of the piston element (16) through which gas can flow off the piston seat (12), the groove (30) being configured so as to allow a gas flow into the housing (10) ahead of the piston element (16) viewed in the displacing direction (R), wherein the groove (30) extends over more than the length of the displacing distance.

8. The linear drive according to claim 7, wherein the length of the groove ranges from 35 mm to 70 mm.

9. The linear drive according to claim 7, wherein a cross-sectional area of the groove increases over the length of the displacing distance.

10. A linear drive-for a belt tensioner, comprising a housing (10) including a piston seat (12), a piston element (16) connected to a gear rack (22) being movably accommodated in the piston seat (12) and a pyrotechnical drive element adapted to supply gas for displacing the piston element (16), wherein the inner wall of the piston seat (12) includes a groove (30) extending in the displacing direction (R) of the piston element (16) through which gas can flow off the piston seat (12), the groove (30) being configured so as to allow a gas flow into the housing (10) ahead of the piston element (16) viewed in the displacing direction (R), wherein the groove (30) widens in the displacing direction (R).

\* \* \* \* \*